(12) United States Patent
Kumar et al.

(10) Patent No.: US 12,113,698 B2
(45) Date of Patent: Oct. 8, 2024

(54) TECHNIQUES FOR ALLOWING SOFTWARE DEFINED (SD) NETWORK FABRICS TO ACCEPT NETWORK DEVICES FROM OTHER FABRIC TECHNOLOGIES

(71) Applicant: Cisco Technology, Inc., San Jose, CA (US)

(72) Inventors: Rajeev Kumar, San Diego, CA (US); Sanjay K. Hooda, Pleasanton, CA (US); Balaji Pitta Venkatachalapathy, San Ramon, CA (US); Prakash C. Jain, Fremont, CA (US); Rajagopal Venkatraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 17/446,918

(22) Filed: Sep. 3, 2021

(65) Prior Publication Data
US 2023/0074222 A1 Mar. 9, 2023

(51) Int. Cl.
*H04L 45/64* (2022.01)
*H04L 45/02* (2022.01)
*H04L 45/745* (2022.01)

(52) U.S. Cl.
CPC .............. *H04L 45/02* (2013.01); *H04L 45/64* (2013.01); *H04L 45/745* (2013.01)

(58) Field of Classification Search
CPC ....... H04L 45/02; H04L 45/64; H04L 45/745; H04L 45/655; H04L 41/122; H04L 12/10; H04L 12/12
See application file for complete search history.

(56) References Cited

U.S. PATENT DOCUMENTS

| | | | | |
|---|---|---|---|---|
| 10,728,094 | B2* | 7/2020 | Hecker | H04L 45/54 |
| 2013/0341396 | A1* | 12/2013 | Tung | G06F 13/385 |
| | | | | 235/382 |
| 2014/0119367 | A1* | 5/2014 | Han | H04L 12/4633 |
| | | | | 370/389 |
| 2015/0124625 | A1* | 5/2015 | Aldrin | H04L 45/42 |
| | | | | 370/238 |
| 2015/0249599 | A1* | 9/2015 | Song | H04L 45/46 |
| | | | | 709/226 |
| 2015/0381493 | A1* | 12/2015 | Bansal | H04L 45/741 |
| | | | | 370/392 |
| 2016/0036706 | A1* | 2/2016 | Hiscock | H04L 45/66 |
| | | | | 370/230 |
| 2017/0201452 | A1* | 7/2017 | Shivhare | H04J 14/08 |
| 2018/0241824 | A1 | 8/2018 | He et al. | |
| 2018/0351862 | A1* | 12/2018 | Jeganathan | H04L 45/586 |
| 2019/0297000 | A1* | 9/2019 | Dutta | H04L 45/16 |

(Continued)

*Primary Examiner* — Ayaz R Sheikh
*Assistant Examiner* — Mang Boi Thawng
(74) *Attorney, Agent, or Firm* — Patterson + Sheridan, LLP

(57) ABSTRACT

Techniques and apparatus for allowing a network fabric to accept network devices associated with other fabric networks are described. An example technique involves establishing a communication session between a first network node and a first control plane of the network fabric, wherein the first network node supports a second control plane different from the first control plane; First routing information from the first network node is imported into a first routing table of the first control plane. Second routing information from a second network node is imported into a second routing table of the first network node.

20 Claims, 5 Drawing Sheets

(56) References Cited

U.S. PATENT DOCUMENTS

| | | |
|---|---|---|
| 2019/0319871 A1* | 10/2019 | Indiresan ................ H04L 45/04 |
| 2020/0059381 A1 | 2/2020 | Uttaro et al. |
| 2020/0099585 A1* | 3/2020 | Chen ....................... H04L 65/40 |
| 2020/0382420 A1 | 12/2020 | Suryanarayana et al. |
| 2021/0075728 A1 | 3/2021 | Indiresan et al. |
| 2021/0243118 A1* | 8/2021 | Suryanarayana ... G06F 9/45541 |

* cited by examiner

TECHNIQUES FOR ALLOWING SOFTWARE DEFINED (SD) NETWORK FABRICS TO ACCEPT NETWORK DEVICES FROM OTHER FABRIC TECHNOLOGIES

TECHNICAL FIELD

Embodiments presented in this disclosure generally relate to network fabrics, and more specifically, to techniques for allowing a network fabric to accept network devices associated with other fabric networks.

BACKGROUND

Many applications may involve communications across multiple network fabrics. The devices in different network fabrics establish communication pathways with each other through border nodes in the fabrics. These border nodes are responsible for establishing and maintaining the communication pathways between the fabrics and for routing incoming and outgoing packets to their destinations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
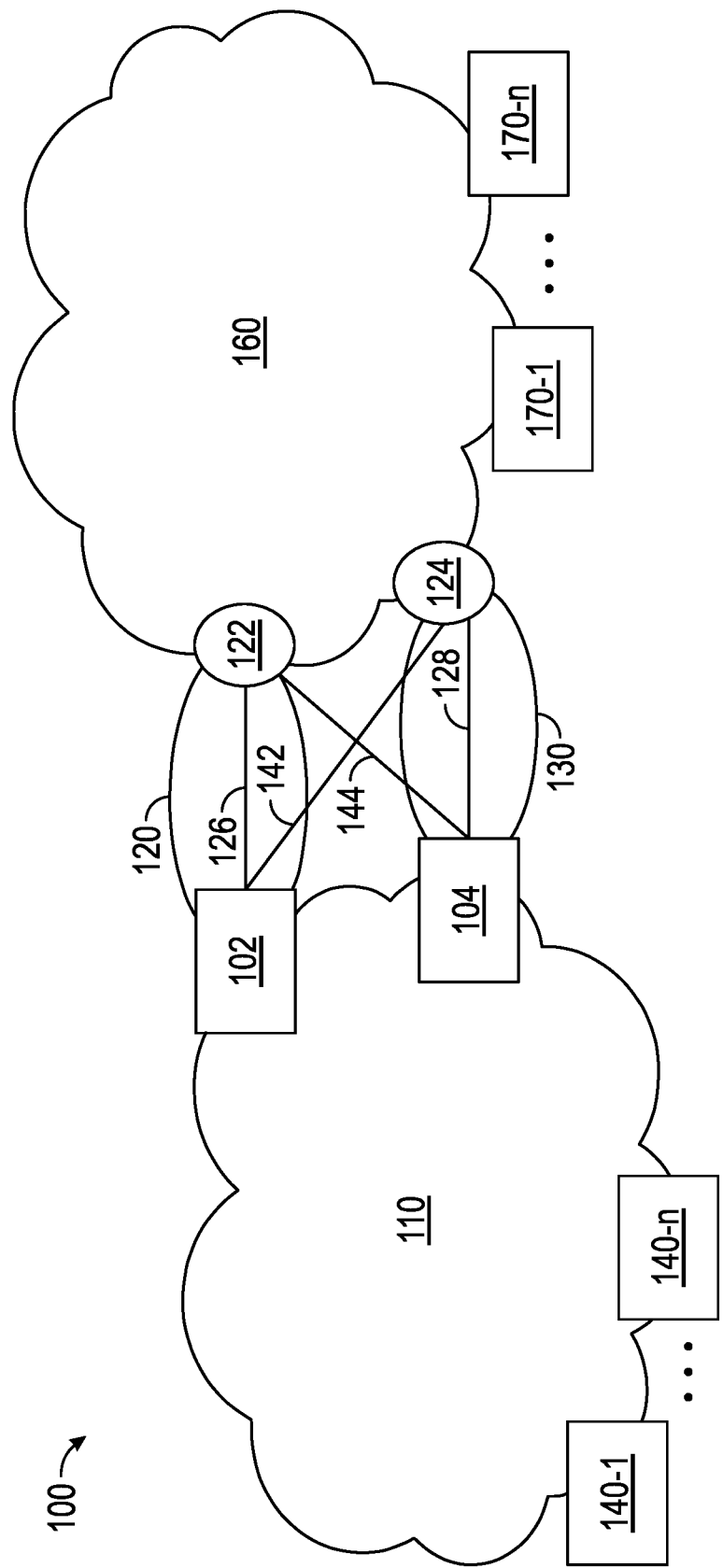
FIG. 1 illustrates an example networking system.

One embodiment presented in this disclosure is a computer-implemented method. The computer-implemented method includes establishing, by a controller of a first control plane of a network fabric, a communication session between a first network node and the first control plane of the network fabric. The first network node supports a second control plane different from the first control plane. The computer-implemented method also includes importing, by the controller via the communication session, first routing information from the first network node into a first routing table of the first control plane. The first routing information includes a first endpoint identifier of the first network node. The first endpoint identifier is associated with a first overlay identifier for the first network node. The computer-implemented method further includes exporting, by the controller via the communication session, second routing information from at least one second network node into a second routing table of the first network node.

Another embodiment presented in this disclosure is a network device. The network device includes a processor and a memory containing a program that, when executed by the processor, performs an operation. The operation includes establishing a communication session between a first network node and a first control plane of a network fabric. The first network node supports a second control plane different from the first control plane and the network device is a controller of the first control plane. The operation also includes importing, via the communication session, first routing information from the first network node into a first routing table of the first control plane. The first routing information includes a first endpoint identifier of the first network node. The first endpoint identifier is associated with a first overlay identifier for the first network node. The operation further includes exporting, via the communication session, second routing information from at least one second network node into a second routing table of the first network node.

Another embodiment presented in this disclosure is a computer-readable medium. The computer-readable medium includes computer program code that, when executed by one or more processors, performs an operation. The operation includes establishing, by a controller of a first control plane of a network fabric, a communication session between a first network node and the first control plane of the network fabric. The first network node supports a second control plane different from the first control plane. The operation also includes importing, by the controller via the communication session, first routing information from the first network node into a first routing table of the first control plane. The first routing information includes a first endpoint identifier of the first network node. The first endpoint identifier is associated with a first overlay identifier for the first network node. The operation further includes exporting, by the controller via the communication session, second routing information from at least one second network node into a second routing table of the first network node.

EXAMPLE EMBODIMENTS

In conventional systems, there may be limited interoperability between different network fabrics. In some cases, for example, the network fabrics may use a common data-path (or data plane) technology (e.g., Layer 2 (L2) protocol), but may support different control plane technology (e.g., L3 protocols). In these cases, the first network fabric may be able to exchange communications with another second network fabric via border nodes. For example, one or more border nodes in the first network fabric may establish communication pathways with one or more border nodes in the second network fabric, and communications (and other information) may be routed between the first and second network fabrics via the communication pathways.

However, while communications between the network fabrics may be facilitated with border nodes, the first network fabric may not be able to accept (or support) network devices (or nodes) from the second network fabric as part of the first network fabric. Similarly, the second network fabric may not be able to accept (or support) network devices (or nodes) from the first network fabric as part of the second network fabric. In one reference example, assume the first network fabric supports software-defined (SD) access technology (e.g., an SD-access network fabric) and the second network fabric supports Border Gateway Protocol (BGP) Ethernet Virtual Private Network (EVPN) (BGP-EVPN) (e.g., a BGP-EVPN network fabric). In this example, because the SD-access network fabric supports different control plane technology than the BGP-EVPN network fabric, the SD-access network fabric may not be able to accept nodes of the BGP-EVPN network fabric as part of the SD-access fabric, and vice versa. That is, the SD-access network fabric may not be able to directly interact with the BGP-EVPN nodes (as part of managing or configuring the SD-access network fabric), add or remove the BGP-EVPN nodes from the SD-access network fabric, integrate services provided by the BGP-EVPN network fabric with the SD-access network fabric, etc.

To address this, embodiments described herein provide techniques that allow a network fabric to directly interact with nodes of another network fabric, where the network fabrics support different control plane technologies. More specifically, embodiments enable a first network fabric to accept (or support or add), as a part of the first network fabric, a network device (or node) associated with (or that supports) a different second network fabric. As described below, embodiments may import routing information associated with the network device (of the second network fabric) into a control plane associated with the first network fabric and maintain the routing information associated with the network device (of the second network fabric) during the import. Additionally, embodiments can enable (i) the control plane of the first network fabric to reflect identifying information of one or more nodes across the first network fabric and the second network fabric and (ii) the control plane of the second network fabric to reflect identifying information of one or more nodes across the first network fabric and the second network fabric.

FIG. 1 illustrates a networking system 100. The networking system 100 (also referred to as network system) includes a border node 102 and a border node 104 in a network fabric 110. In some examples, the border nodes 102 and 104 sever as an external ingress and egress function for the network fabric 110. In some examples, the networking system 100 may use software to form software-defined (SD) networks. For example, the network fabric 110 may include an SD-access (SDA) fabric including endpoints 140-1 to 140-n. In an example where the network fabric 110 is a SDA fabric, the endpoints 140-1 to 140-n may be referred to as fabric edges (FEs) and may include associated endpoint identifiers (EIDs) for identification in the network fabric 110.

The border nodes 102 and 104 are associated with a first external traffic connection such as the external route 120 associated with the border node 102 and the external route 130 associated with the border node 104. In some examples, the external routes 120 and 130 are SD wide area networks (SD-WAN) and/or networks provided by one or more service providers providing access to an external network 160 via the external connection nodes 122 and 124. In some examples, the external network 160 includes external networks, such as the Internet, a service provider external network, another fabric external to the network fabric 110, etc. In one particular embodiment, the external network 160 is a fabric network that supports BGP-EVPN (e.g., a BGP-EVPN network fabric). The external network 160 includes network nodes 170-1 to 170-n. In embodiments where the external network 160 is a BGP-EVPN network fabric, the BGP-EVPN network fabric may implement a spine-leaf architecture, where the network nodes 170-1 to 170-n are leaf switches. In various embodiments, the leaf switches 170-1 to 170-n may retain addressing information for devices connected thereto or that have previously been in communication with the switch in an internal cache.

The border nodes 102 and 104 maintain connections to the external network 160 through the external routes 120 and 130 via network connections 126 and 128, respectively. In some examples, the border nodes 102 and 104 also maintain alternate connections to the external network 160 through the alternate external connections 142 and 144, respectively. However, while the network fabric 110 can communicate with the external network 160 via border nodes 102 and 104, the network fabric 110 generally cannot support adding (or incorporating) network nodes 170-1 to 170-n as part of the network fabric 110.

Figure 2:
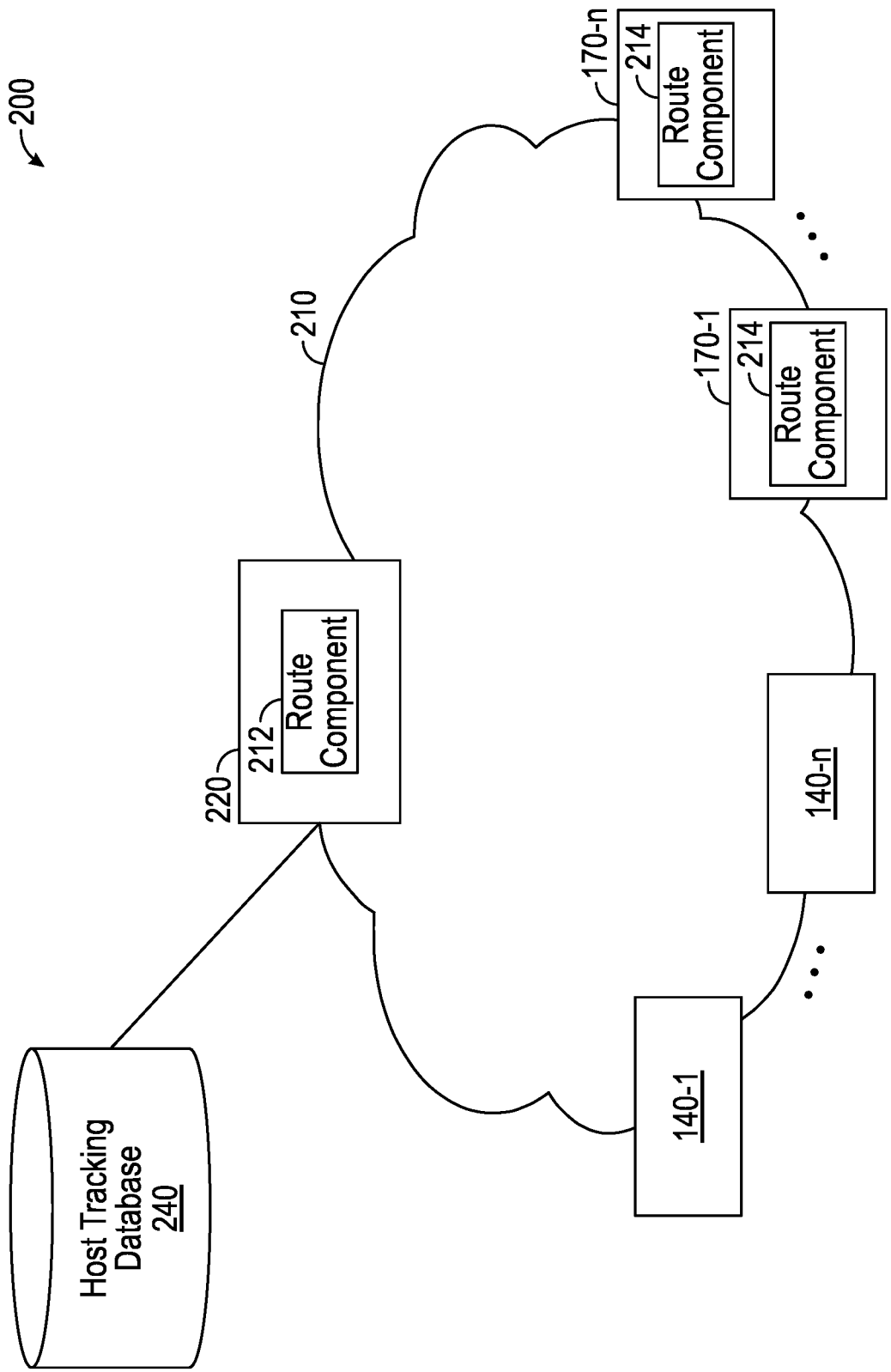
FIG. 2 illustrates an example network architecture configured to support one or more network nodes associated with a different control plane, according to one embodiment.

In one embodiment described herein, a network fabric is configured to support one or more network nodes associated with a different network fabric. FIG. 2, for example, illustrates an example network architecture 200, which includes a network fabric 210, a central controller 220, and a host tracking database 240. The network fabric 210 includes one or more network nodes 140 1-n and one or more network nodes 170 1-n.

In one embodiment, the network architecture 200 may be implemented as a Cisco Application Center Infrastructure (ACI) or SDN. From a management perspective, the central controller 220 (e.g., SDN controller) (also referred to as the Application Policy Infrastructure Controller (APIC)) manages and configures the policy on one or more of the nodes 140 1-n in the network fabric 210. The central controller 220 can act as a central repository for all policies and has the ability to rapidly deploy and re-deploy hardware, as needed, based on network performance. The SDN may also serve as a platform for other services that are performed within the data center or cloud environment. For example, through the use of the central controller 220, third party services may be integrated for advanced security, load balancing, and monitoring. Note that ACI is merely used as an example of an SDN platform. The embodiments herein are not limited to such and can be used with any other suitable SDN platform.

In the network architecture 200, network nodes 140 1-n may be initially configured to support SDN technology (e.g., SDN-capable network nodes), and the network nodes 170 1-n may not be initially configured to support SDN technology (e.g., non-SDN-capable network nodes). For example, the network nodes 140 1-n may support a first control plane technology and the network nodes 170 1-n may support a different second control plane technology. In some embodiments, the control plane supported by the network nodes 140 1-n may use a routing protocol, such as Locator/ID Separation Protocol (LISP), to route communication traffic, and the control plane supported by the network nodes 170 1-n may use a different routing protocol, such as BGP-EVPN to route communication traffic. In routing protocols, such as BGP-EVPN, there may not be a central control plane, whereas in routing protocols, such as LISP, there may be a central control plane (e.g., central controller 220). In examples where the network nodes 170 1-n support BGP-EVPN, the network nodes 170 1-n may be referred to as BGP-EVPN leafs (or leaf nodes).

Embodiments herein can enable the network architecture 200 to support both network nodes 140 1-n (SDN-capable network nodes) and network nodes 170 1-n (non SDN-capable network nodes) as part of the network fabric 110 (when implanted as a SDN fabric). As shown, the central controller 220 includes a routing component 212, and each of the network nodes 170 1-*n* includes a routing component 214. The routing component 212 is generally configured to implement one or more techniques described herein for enabling the network fabric 210 to directly interact with (and support) network nodes 170 1-*n*, which do not have native support for the control plane technology used by the network fabric 210. Similarly, the routing component 214 is generally configured to implement one or more techniques described herein for enabling the network nodes 170 1-*n* to be accepted as part of the network fabric 210, e.g., as FEs.

In one embodiment, the routing components 212, 214 are configured to establish communication sessions with each other. For example, each routing component 214 can establish a communication session with the routing component 212. Once the communication sessions are established, the routing component 212 can import routing information associated with each of the network nodes 170 1-*n* into a routing table associated with the central controller 220. Similarly, each routing component 214 can import routing information maintained by the routing component 212 (for each of the network nodes 140 1-*n*) into a routing table maintained by the routing component 214. In one embodiment, the routing table associated with the central controller 220 may be located within the host tracking database 240.

Additionally, in embodiments herein, the routing component 212 may maintain original L2 overlay information associated with the network nodes 170 1-*n* within the routing table in the host tracking database 240. For example, the L2 overlay information can include at least one of a routing locator (RLOC), transport location (TLOC), or virtual tunnel endpoint (VTEP). Similarly, each routing component 214 can maintain original L2 overlay information associated with the network node 140 1-*n* within the routing table maintained by the routing component 214.

In one embodiment, the central controller 220 may be implemented with a general-purpose computing device or may be implemented with multiple computing devices distributed across a network. The central controller 220 can include a processor, communication ports, memory, and storage. The processor may be any processing element capable of performing the functions described herein. The processor can represents a single processor, multiple processors, a processor with multiple cores, and combinations thereof. The communication ports facilitate communication between the central controller 220 and other network devices (e.g., network nodes 140 1-*n*). The memory may be either volatile or non-volatile memory and include RAM, flash, cache, disk drives and the like. The memory may be divided into different memory storage elements such as RAM and one or more hard disk drives. The memory may include the routing component 212, which may include hardware components, software modules, or combinations thereof. The routing component 212 is described in more detail below. The storage may include a routing table for storing routing information associated with one or more network nodes of the network fabric.

In one embodiment, each network node 170 may include a processor, communication ports, memory, and storage. The processor may be any processing element capable of performing the functions described herein. The processor can represents a single processor, multiple processors, a processor with multiple cores, and combinations thereof. The communication ports facilitate communication between the network node 170 and other network devices (e.g., central controller 220, network nodes 170, etc.). The memory may be either volatile or non-volatile memory and include RAM, flash, cache, disk drives and the like. The memory may be divided into different memory storage elements such as RAM and one or more hard disk drives. The memory may include the routing component 214, which may include hardware components, software modules, or combinations thereof. The routing component 214 is described in more detail below. The storage may include a routing table for storing routing information associated with one or more network nodes of the network fabric.

Figure 3:
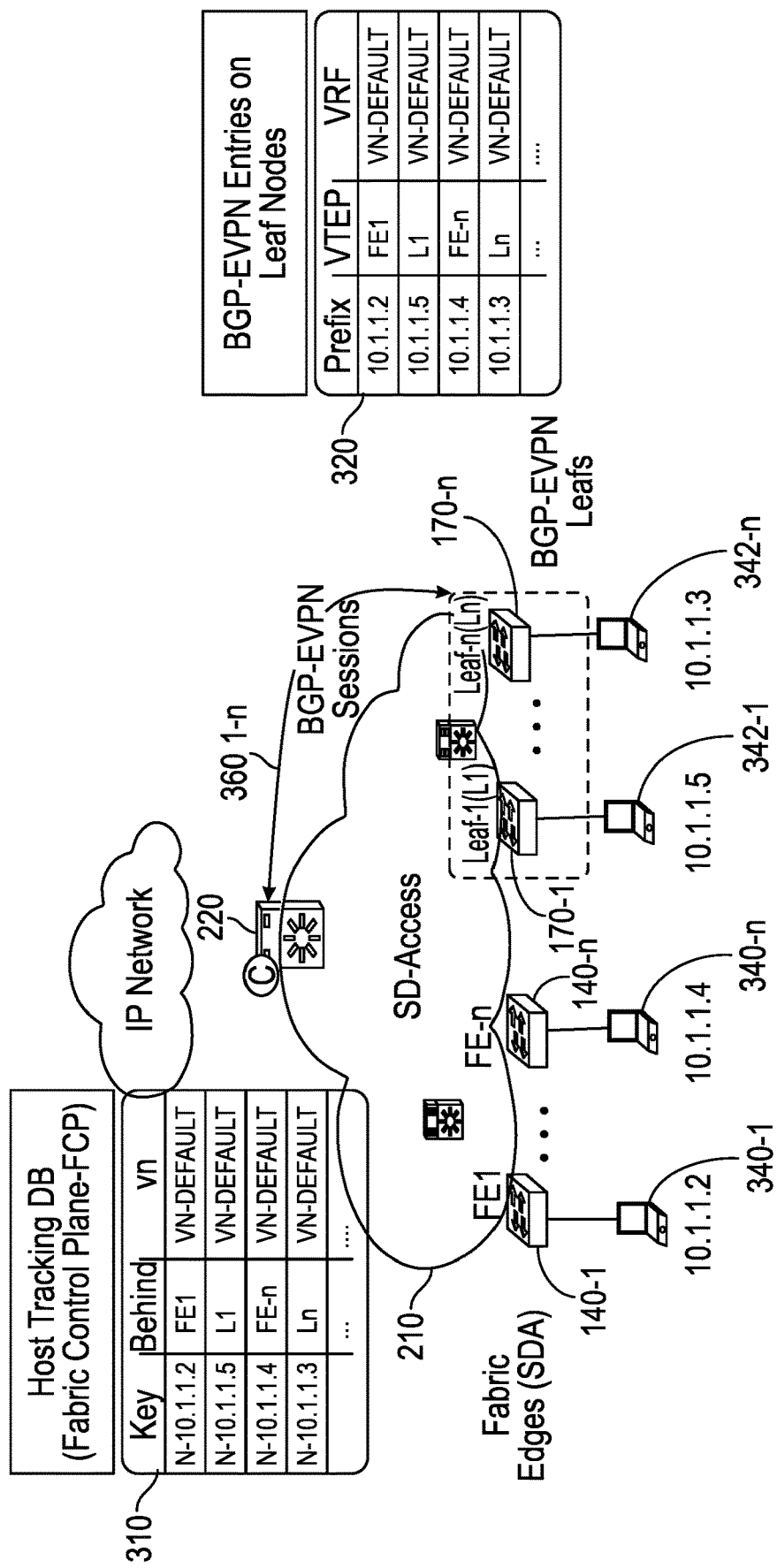
FIG. 3 illustrates an example scenario of accepting a network node into a network fabric that supports a different control plane, according to one embodiment.

FIG. 3 illustrates an example implementation of accepting a leaf node into a network fabric 210, which supports a different control plane, according to one embodiment. Here, the network fabric 210 includes network nodes 140 1-*n* (e.g., FE-1 to FE-n) and network nodes 170 1-*n* (e.g., Leaf-1 to Leaf-N). The network nodes 140 1-*n* may support the same L2 protocol (or data plane technology) (e.g., Virtual Extensible Local Area Network (VXLAN)) as network nodes 170 1-*n*, but the network nodes 140 1-*n* may support a different control plane than network nodes 170 1-*n*. For instance, network nodes 140 1-*n* may support a central control plane (e.g., SDN), whereas network nodes 170 1-*n* may not support a central control plane. In this particular embodiment, the network nodes 140 1-*n* support a central control plane that uses LISP to distribute routing information (e.g., via the central controller 220), and the network nodes 170 1-*n* support a control plane that uses BGP-EVPN to distribute routing information (e.g., without a central controller).

The network nodes 140 1-*n* may be connected to hosts 340 1-*n*, respectively. The network nodes 170 1-*n* may be connected to hosts 342 1-*n*, respectively. In particular, network node 140-1 is connected to host 340-1, which has IP address "10.1.1.2," network node 140-*n* is connected to host 340-*n*, which has IP address "10.1.1.4," network node 170-1 is connected to host 342-1, which has IP address "10.1.1.5," and network node 170-*n* is connected to host 342-*n*, which has IP address "10.1.1.3."

In this embodiment, to enable each network node 170 1-*n* to join the network fabric 210 as an FE node, a BGP-EVPN communication session 360 is established between the central controller 220 and each network node 170 1-*n*. For each network node 170, the central controller 220 may appear as a BGP route reflector (RR). The same instance-identifiers (for each pool shared by BGP-EVPN) may be configured on each network node 170.

The central controller 220 (using the routing component 212) may be configured to accept, via the BGP-EVPN communication session 360 1-*n*, the EVPN routes (along with VTEP info) coming from each of the network nodes 170. The central controller 220 can add a LISP map-server entry for each corresponding instance-identifier in the routing table 310. In some embodiments, the central controller 220 may be configured with a set of command line interfaces (CLIs) to accept the EVPN routes coming from each of the network nodes 170 into the routing table 310. In some embodiments, the central controller 220 can mark the LISP map-server entries with an additional flag to indicate that it belongs to an EVPN route or LISP route. Additionally, in some embodiments, the central controller 220 (using the routing component 212) may be configured with a set of CLIs to export all of the routes (along with the RLOC/VTEP information) to each of the network nodes 170 1-*n* via respective BGP-EVPN communication sessions 360 1-*n*.

Once the LISP routes are exported via the central controller 220, the network nodes 170 1-*n* can receive all the BGP-EVPN routes and LISP routes (along with the VTEP/RLOC information) using a BGP-EVPN routing protocol and can program their hardware accordingly. For example, each network node 170 may maintain a routing table 320, which includes the BGP-EVPN routes and LISP routes.

Once all BGP-EVPN routes are present in the routing table 310, the central controller 220 may receive (e.g., from an edge device) a request for a route behind one or more of the network nodes 170. In response to the request, the central controller 220 can respond with a map-cache pointing towards the VTEP (in terms of RLOC) of the network node 170. Additionally, since the data-plane in both LISP and BGP-EVPN may be the same (e.g., VXLAN), the data path can work seamlessly without each side knowing what the other side is.

In the particular embodiment shown in FIG. 3, the RLOC/TLOC/VTEP information associated with each of the network nodes 170 1-*n* is preserved as the network nodes 170 1-*n* join the network fabric 210. To preserve the RLOC/TLOC/VTEP information, embodiments can modify the update of the endpoint-ids (EIDs) for each network node 170, so that as the EID reaches the central controller 220, its VTEP is preserved. In other words, the VTEP information may be maintained on import of the BGP-EVPN routes to the central controller 220. The EID may be registered to the network fabric 210 (with its preserved VTEP).

As also shown in FIG. 3, the RLOC/TLOC/VTEP information associated with each of the network nodes 140 1-*n* is preserved as the routing information is exported to BGP-EVPN control plane. For example, the EIDs (associated with network nodes 140 1-*n*) may be exported to the BGP-EVPN control plane, while maintaining their original VTEP information. The EIDs received from a network node 170 may be reflected to other network nodes 170 using the fabric control plane.

Figure 4:
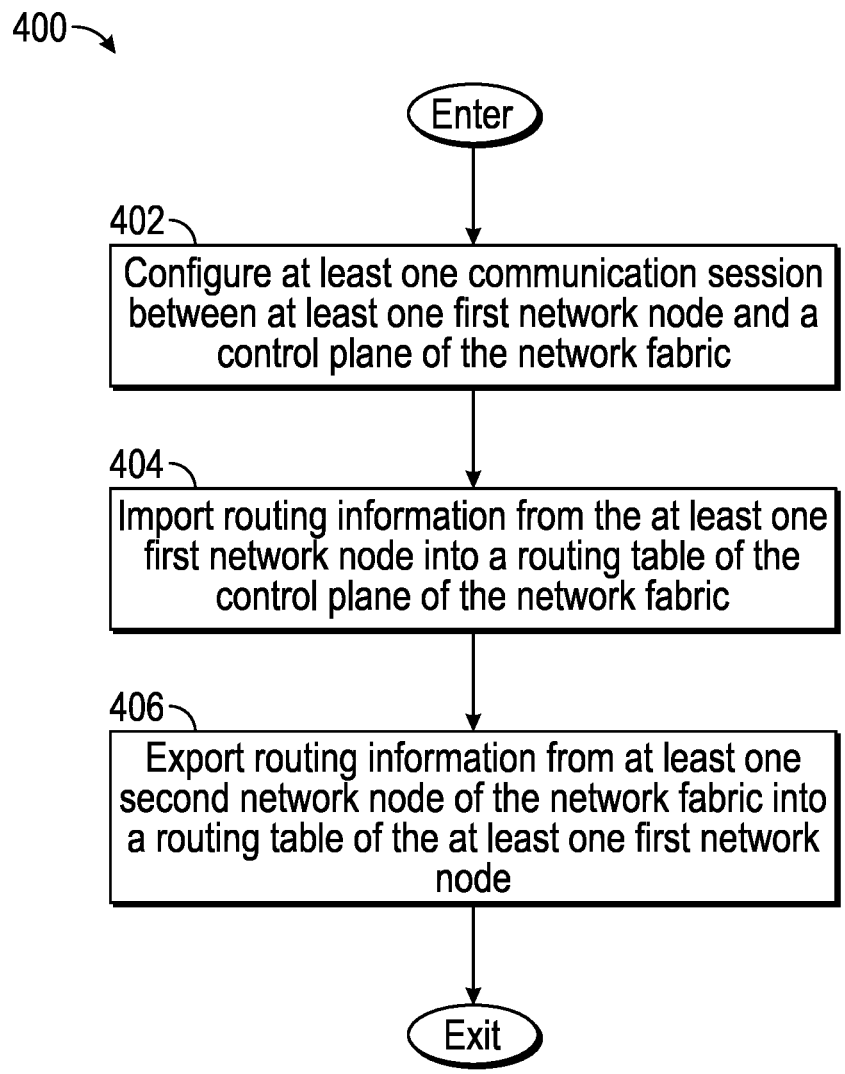
FIG. 4 is a flowchart of a method for accepting a network node into a network fabric that supports a different control plane, according to one embodiment.

FIG. 4 is a flowchart of a method 400 for accepting at least one (first) network node (e.g., leaf node(s), such as network node(s) 170) into a network fabric (e.g., network fabric 210) that supports a different control plane than the at least one (first) network node, according to one embodiment. The method 400 may be performed by a central controller (e.g., central controller 220) of a control plane supported by the network fabric.

Method 400 may enter at block 402, where the central controller configures at least one communication session (e.g., communication session(s) 360) between the at least one first network node and a control plane of the network fabric. The control plane of the network fabric may be a central control plane, e.g., based on LISP. The control plane supported by the at least one first network node may be a control plane based on BGP-EVPN. In some embodiments, the communication session may be established using the control plane supported by the first network node. For example, the communication session can include a BGP-EVPN communication session.

At block 404, the central controller imports routing information from the at least one first network node into a routing table (e.g., routing table 310) of the control plane of the network fabric. In one embodiment, the routing information from the at least one first network node may include an EID for each of the at least one first network node. The EID may be associated with a VTEP for the at least one first network node.

At block 406, the central controller exports routing information from at least one second network node (e.g., network node(s) 140) into a routing table of the at least one first network node. The routing information from the at least one second network node may include an EID for each of the at least one second network node. The EID may be associated with a VTEP for the at least one second network node.

Figure 5:
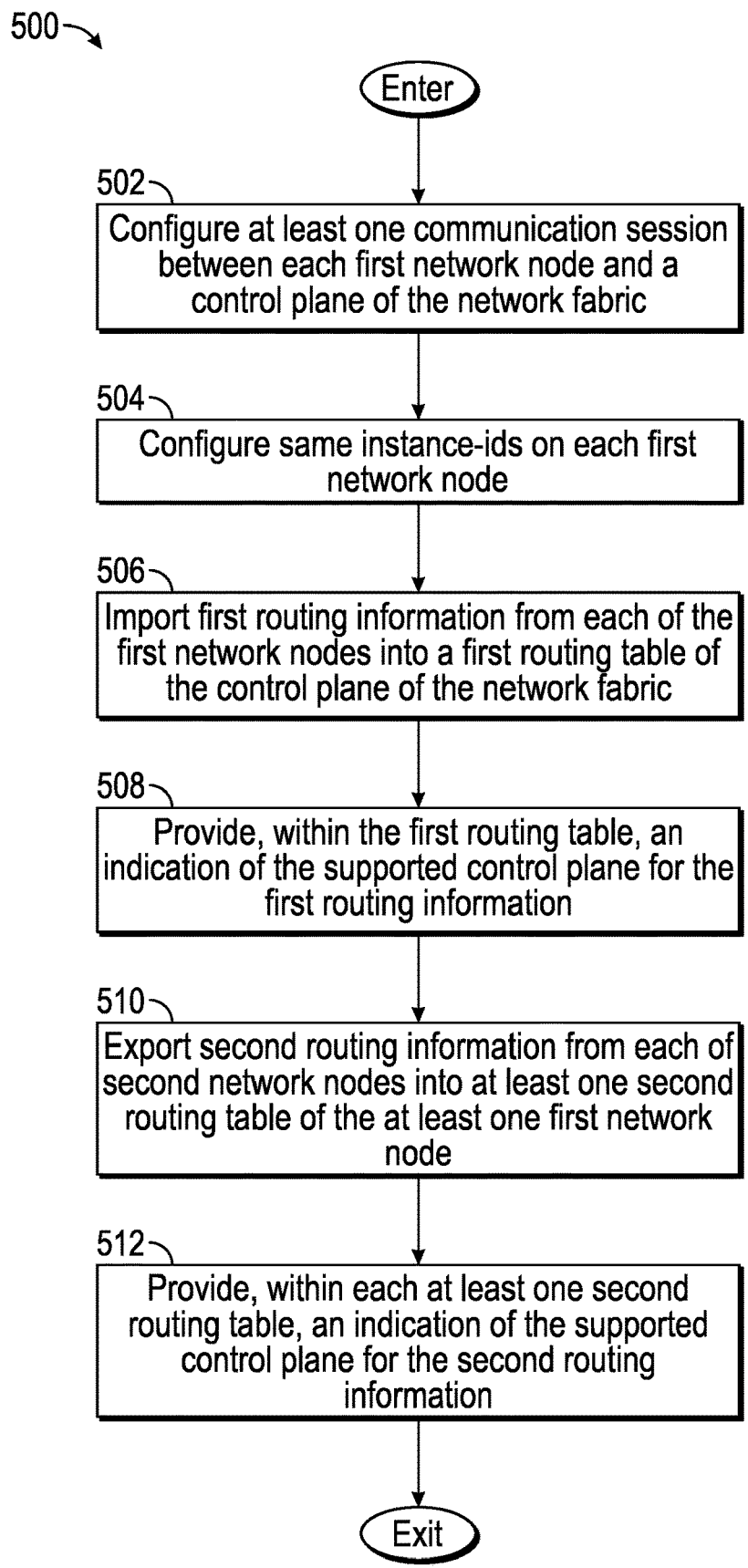
FIG. 5 is a flowchart of another method for accepting a network node into a network fabric that supports a different control plane, according to one embodiment.

FIG. 5 is a flowchart of a method 500 for accepting at least one (first) network node (e.g., leaf node(s), such as network node(s) 170) into a network fabric (e.g., network fabric 210) that supports a different control plane than the at least one (first) network node, according to one embodiment. The method 500 may be performed by a central controller (e.g., central controller 220) of a control plane supported by the network fabric.

Method 500 may enter at block 502, where the central controller configures at least one communication session (e.g., communication session(s) 360) between each first network node and a control plane of the network fabric. At block 504, the central controller configures same instance-ids on each first network node. The instance-ids may be associated with a pool shared by the control plane (e.g., BGP-EVPN) of the first network nodes.

At block 506, the central controller imports first routing information from each of the first network nodes into a first routing table (e.g., routing table 310) of the control plane of the network fabric. In one embodiment, the central controller may use a set of CLIs to accept the first routing information coming from each of the first network nodes and may add entries for the first routing information into the first routing table. The first routing information may include EVPN route information (along with the original VTEP information) for each of the first network nodes. That is, the original VTEP information from each first network node may be maintained during the import into the first routing table.

At block 508, the central controller provides, within the first routing table, an indication of the supported control plane for the first routing information. For example, the central controller can mark the added entries (for the imported first routing information in the first routing table) with a flag to indicate that the routing information includes EVPN route information.

At block 510, the central controller exports second routing information from each of second network nodes (e.g., network nodes 140) into at least one second routing table (e.g., routing table 320) of the at least one first network node. In one embodiment, the central controller may use a set of CLIs to export the second routing information (from each of the second network nodes) into the at least one second routing table. The second routing information may include LISP route information (along with the original RLOC/VTEP information) for each of the second network nodes.

At block 512, the central controller provides, within each at least one second routing table, an indication of the supported control plane for the second routing information. For example, the central controller can mark the added entries (for the imported second routing information in the second routing table) with a flag to indicate that the routing information includes LISP route information.

In some embodiments, the method 500 may further include the central controller receiving a request for a route that is behind a given network node 170. In response to the request, the central controller can respond with routing information that indicates the original VTEP associated with that network node 170 (in terms of RLOC). The method 500 may then exit.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
    establishing, by a controller of a first network fabric that supports a first control plane, a communication session between (i) a first network node within a second network fabric different from the first network fabric and (ii) the controller, wherein the first network node supports a second control plane different from the first control plane, and the communication session is established using the second control plane;
    importing, by the controller via the communication session, first routing information from the first network node into a first routing table of the first control plane, wherein the first routing information comprises a first endpoint identifier of the first network node, the first endpoint identifier being associated with a first overlay identifier for the first network node; and
    exporting, by the controller via the communication session, second routing information from at least one second network node within the first network fabric into a second routing table of the first network node.

2. The computer-implemented method of claim 1, wherein:
    the first overlay identifier for the first network node is an original overlay identifier assigned to the first network node via the second control plane; and the original overlay identifier is maintained as the first routing information is imported into the first routing table.

3. The computer-implemented method of claim 2, further comprising:
receiving, by the controller, a request for a route associated with the first network node;
in response to the request, determining, by the controller, information associated with the route, based on the first routing information within the first routing table; and
sending, by the controller, a response comprising an indication of the information associated with the route.

4. The computer-implemented method of claim 3, wherein the indication of the information associated with the route comprises the original overlay identifier for the first network node.

5. The computer-implemented method of claim 1, further comprising providing, by the controller, reflection of the first endpoint identifier to the at least one second network node.

6. The computer-implemented method of claim 1, further comprising providing, by the controller, an indication within the first routing table of the first control plane associated with the first routing information.

7. The computer-implemented method of claim 1, wherein the second routing information comprises at least one second endpoint identifier of the at least one second network node, the at least one second endpoint identifier being associated with a second overlay identifier for the at least one second network node.

8. The computer-implemented method of claim 7, wherein:
the second overlay identifier for the at least one second network node is an original overlay identifier associated to the at least one second network node via the first control plane; and
the original overlay identifier is maintained as the second routing information is exported into the second routing table.

9. The computer-implemented method of claim 7, further comprising providing, by the controller, reflection of the at least one second endpoint identifier to the first network node.

10. A network device comprising:
one or more memories collectively storing computer-executable instructions; and
one or more processors coupled to the one or more memories, the one or more processors being collectively configured to execute the computer-executable instructions to cause the network device to perform an operation comprising:
establishing a communication session between the network device and a first network node, wherein the network device is a controller of a first network fabric that supports a first control plane, the first network node is within a second network fabric different from the first network fabric and supports a second control plane different from the first control plane, and the communication session is established using the second control plane;
importing, via the communication session, first routing information from the first network node into a first routing table of the first control plane, wherein the first routing information comprises a first endpoint identifier of the first network node, the first endpoint identifier being associated with a first overlay identifier for the first network node; and
exporting, via the communication session, second routing information from at least one second network node within the first network fabric into a second routing table of the first network node.

11. The network device of claim 10, wherein:
the first overlay identifier for the first network node is an original overlay identifier assigned to the first network node via the second control plane; and
the original overlay identifier is maintained as the first routing information is imported into the first routing table.

12. The network device of claim 11, the operation further comprising:
receiving a request for a route associated with the first network node;
in response to the request, determining information associated with the route, based on the first routing information within the first routing table; and
sending a response comprising an indication of the information associated with the route.

13. The network device of claim 12, wherein the indication of the information associated with the route comprises the original overlay identifier for the first network node.

14. The network device of claim 10, the operation further comprising providing reflection of the first endpoint identifier to the at least one second network node.

15. The network device of claim 10, the operation further comprising providing an indication within the first routing table of the first control plane associated with the first routing information.

16. The network device of claim 10, wherein the second routing information comprises at least one second endpoint identifier of the at least one second network node, the at least one second endpoint identifier being associated with a second overlay identifier for the at least one second network node.

17. The network device of claim 16, wherein:
the second overlay identifier for the at least one second network node is an original overlay identifier associated to the at least one second network node via the first control plane; and
the original overlay identifier is maintained as the second routing information is exported into the second routing table.

18. The network device of claim 16, the operation further comprising providing reflection of the at least one second endpoint identifier to the first network node.

19. A non-transitory computer-readable medium comprising computer program code that, when collectively executed by one or more processors, performs an operation comprising:
establishing, by a controller of a first network fabric that support a first control plane, a communication session between (i) a first network node within a second network fabric different from the first network fabric and (ii) the controller, wherein the first network node supports a second control plane different from the first control plane, and the communication session is established using the second control plane;
importing, by the controller via the communication session, first routing information from the first network node into a first routing table of the first control plane, wherein the first routing information comprises a first endpoint identifier of the first network node, the first endpoint identifier being associated with a first overlay identifier for the first network node; and
exporting, by the controller via the communication session, second routing information from at least one second network node within the first network fabric into a second routing table of the first network node.

20. The non-transitory computer-readable medium of claim 19, wherein:
the first overlay identifier for the first network node is an original overlay identifier assigned to the first network node via the second control plane; and
the original overlay identifier is maintained as the first routing information is imported into the first routing table.

* * * * *